3,509,061
METHOD AND COMPOSITIONS FOR DISPLACING
ORGANIC LIQUIDS FROM SOLID SURFACES
William A. Zisman, Silver Spring, Md., and Marianne K. Bernett, Washington, D.C., assignors to the United States of America as represented by the Secretary of the Navy
No Drawing. Filed Oct. 18, 1966, Ser. No. 588,258
Int. Cl. C09d 9/04
U.S. Cl. 252—171    8 Claims

ABSTRACT OF THE DISCLOSURE

A nonaqueous liquid surface-active composition for displacing organic films from solid surfaces. The composition is a solution in which both the solute and the solvent are active displacing agents. The solute is an organic fluoro compound and may be a fluoroalcohol, a fluoromonocarboxylic acid, a partially fluorinated diester, a partially fluorinated silane, a fully fluorinated hydrocarbon or a chloro-substituted fully fluorinated hydrocarbon. The solvent is a volatile liquid perfluoroalkane or fully fluorinated bromo- or chloroalkane.

---

The invention described herein may be manufactured and used by or for the Goverenment of the United States of America for governmental purposes without the payment of any royalties thereon or therefor.

This invention relates to a method and composition for surface-chemical displacing of liquid organic films from solid surfaces. The term film as used herein means a layer of an organic liquid which is physically adsorbed to a solid surface.

The usual procedures presently employed for removing oily films from solid surfaces of electrical, electronic or mechanical equipment involves spraying the solid surfaces with a solvent for the oily material or with an aqueous emulsion which contains a volatile solvent, a penetrant oil and a surface-active agent and functions through surface-chemical activity to displace the oily film.

The solvent film-removing procedure is simply a solvent-washing of the solid surface and depends essentially on the solubility of the oily material in the solvent.

The aqueous emulsion film-removing procedure requires spraying of the emulsion to the solid surface whereby the emulsion is broken on contact with the surface to release the penetrant oil which, with the assistance of the surface-active agent in the water of the emulsion, causes displacement of the oily films from the solid surface. The displacement of the oily film is followed by washing of the solid surface with water to remove residues of the oily film and of the applied emulsion. Optionally, the water-washing step is followed by spraying of a water-displacing composition to remove water from the washed surface.

The above prior art procedures require repeated spraying and, resultingly, the use of large amounts of the solvent or of the aqueous emulsion, as the case may be, to achieve a practical degree of displacement of the oily film from the solid surface. The aqueous emulsion procedure, additionally, has the disadvantage of introducing water which would prove detrimental or injurious in the cleaning of watches, meters and other fine mechanisms, optical equipment with sodium chloride windows, and electrical and electronic equipment containing parts which are damaged by water.

It is an object of the present invention to provide an improved surface chemical method of displacing liquid organic films from solid surfaces using nonaqueous liquid compositions.

It is a further object to provide nonaqueous, surface-active liquid compositions for displacing liquid organic films from solid surfaces.

The above and other objects are accomplished by the method of the present invention in which liquid organic films are displaced from solid surfaces by the application thereto of new liquid surface-active compositions which are nonaqueous organic solutions of a solute in a volatile solvent in which both the solute and the solvent, by virtue of their molecular constitution, are active displacing agents. The new liquid compositions are also effective for displacing films of physically adsorbed water from solid surfaces.

In the practice of the method of the invention, the new liquid surface-active compositions may be applied by various procedures to the solid surfaces from which a liquid organic film is to be displaced, such as by spraying or flushing with the compositions or by dipping or immersing the surfaces in a bath of the compositions, with or without ultrasonic agitation. Sprayed onto the solid surfaces, relatively small volumes of the liquid compositions will effectively displace liquid organic films from the surfaces, for example, a few cubic centimeters per 100 square inches of surface area.

Suitable volatile solvents for the liquid compositions of the invention are liquid perfluoroalkanes and fully fluorinated bromo-and chloroalkanes, for example, perfluoropentane, perfluorohexane, trichlorofluoromethane, dibromodifluoromethane, tribromofluoromethane, 1,1,2-trichloro-1,2,2 - trifluoroethane, 1,2 - dibromo-1,1,2,2-tetrafluoroethane, 1,1,1-trichloro-2,2,3,3,3-pentafluoropropane, 1,1,1,3-tetrachloro-2,2,3,3-tetrafluoropropane and 2,2,3-trichloro-1,1,1,3,4,4,4-heptafluorobutane, mixtures thereof, and 1,1,2,2-tetrachloro-1,2-difluoroethane, M.P. 26° C., in liquid form or in solution in one of the liquid perfluoroalkanes or liquid fully fluorinated bromo-or chloroalkanes.

The solute for the new surface-active compositions may be a fluoroalcohol, a fluoromonocarboxylic acid, a partially fluorinated diester, a partially fluoroinated silane, a fully fluorinated hydrocarbon or a chloro-substituted fully fluorinated hydrocarbon as hereinafter more fully defined. The amount of the solute in the compositions is small and may be varied, with selection as to the amount being made on the basis of the liquid displacing activity of the particular solutes. In general, amounts of the solute which are in the range of from about 0.02 to 1% by weight of the compositions will be found effective for surface-chemical displacement of organic liquid films from solid surfaces by the method of the invention.

The method of the invention is effective to displace any liquid organic film from solid surfaces, for example, films of aliphatic and aromatic hydrocarbon oils, liquid fatty acids, liquid alcohols, liquid esters and ketones, etc., from surfaces of solids such as metals, glass, resins and polymers. Particular applications of the method are in the cleaning of oily films from solid surfaces of electrical equipment, such as electric motors, and electronic equipment. When the solute is a fluoroalcohol, a fluoromonocarboxylic acid, or a partially fluorinated diester, the method is also applicable to the cleaning of oily films from optical windows and solid surfaces of watches, meters and other fine mechanisms.

In a single operation, the method displaces the liquid organic film from the solid surface and deposits thereon a monolayer of the solute which prevents respreading of the displaced organic liquid over the solid surface for short, prolonged or indefinite periods of time depending on the solute in the liquid compositions employed. The rate of displacement of the liquid organic film from the solid surface will depend on the solvent and solute in the compositions and also on the organic liquid of the film to be displaced.

The volatile solvent in the new liquid compositions serves as a convenient means to distribute the solute rapidly over the solid surface, aids actively in displacing the liquid organic film from the surface and evaporates quickly leaving the surface oil-and-water-repellent. While the normally liquid solutes of themselves will displace liquid organic films from solid surfaces, they are often expensive or in limited supply. The solvent serves to reduce the quantity of the solute needed for the film-displacing operation. The solvent also extends the range and number of solutes for the surface-chemical displacement by the inclusion of those which are either solids or highly viscous liquids at ordinary temperatures.

Fluoroalcohol solutes suitable for the surface-active compositions are perfluoroalcohols of the formula:

$$F(CF_2)_mCHROH$$

wherein R is a member of the group consisting of hydrogen and perfluoroalkyl radicals having from 1 to 11 carbon atoms and wherein $m$ is an integer from 1 to 11, for example, perfluoroethanol-1, perfluorobutanol-1, perfluorooctanol-1, perfluoropropanol-2, perfluorooctanol-3, etc.; branched chain perfluoroalcohols of the formula:

$$(CF_3)_2CF(CF_2)_mCH_2OH$$

wherein $m$ is an integer from 1 to 11, for example, 3-trifluoromethyl-perfluorobutanol-1, 4-trifluoromethyl-perfluoropentanol-1, 7-trifluoromethyl-perfluorooctanol-1, etc.; partially fluorinated alcohols of the formula:

$$F(CF_2)_m(CH_2)_nCH_2OH$$

wherein $m$ is an integer from 1 to 10 and $n$ is an integer from 1 to 15, for example, 3-trifluoromethyl-propanol-1; 5,5,5,4,4-pentafluoro-pentanol-1; 8,8,8,7,7,6,6-heptafluoro-octanol-1, etc.; omega-hydroperfluoroalkyl carbinols of the formula:

$$H(CF_2)_mCH_2OH$$

wherein $m$ is an integer from 2 to 10, for example, omega-hydroperfluoroethyl carbinol-1, omega-hydroperfluorobutylcarbinol-1, omega-hydroperfluorooctyl carbinol-1, omega-hydroperfluorodecyl carbinol-1, etc.; and branched chain omega-hydroperfluoroalkyl carbinols of the formula:

$$H(CF_2)_mCROH(CH_3)$$

wherein R is a member of the group consisting of hydrogen and methyl radicals and $m$ is an integer from 2 to 8, for example ω-hydroperfluorooctyl-2-ethanol, $H(CF_2)_4CHOH(CH_3)$ and ω-hydroperfluorooctyl-2-methyl-2-ethanol, $H(CF_2)_4COH(CH_3)_2$, etc.

Fluoroacid solutes suitable for the surface-active compositions are perfluoroalkyl monocarboxylic acids of the formula:

$$F(CF_2)_mCOOH$$

wherein $m$ is an integer from 1 to 13, for example, trifluoroacetic acid, heptafluorobutyric acid, pentadecafluorooctanic acid, etc.; branch chain perfluoroalkyl monocarboxylic acids of the formulae:

$$(CF_3)_2CF(CF_2)_mCOOH \text{ and}$$

$$(CF_3)(CF_2Cl)CF(CF_2)_mCOOH$$

wherein m is an integer from 1 to 11, for example, 3-trifluoromethyl perfluorobutanoic acid, 3-difluorochloromethyl perfluorobutanoic acid, 13-trifluoromethyl perfluorotetradecanoic acid, etc.; partially fluorinated monocarboxylic acids of the formula:

$$F(CF_2)_m(CH_2)_nCOOH$$

wherein $m$ is an integer from 1 to 10 and $n$ is an integer from 2 to 16, for example 4-trifluoromethyl-butanoic acid, 11-(heneicosafluorodecyl)-undecanoic acid, 17-(pentadecafluoroheptyl)-heptadecanoic acid etc.; and partially fluorinated monocarboxylic acids of the formula:

$$H(CF_{2m}COOH$$

wherein $m$ is an integer from 1 to 14, for example, 2H-difluoroacetic acid, 7H-dodecafluoroheptanoic acid, 11H-eicosafluoro undecanoic acid, etc.

Partially fluorinated aliphatic diesters for the new surface-active compositions have the formulae:

$$(CH_2)_xCHR_1[COOCH_2(CF_2)_mF]_2$$

wherein $R_1$ is a member of the group consisting of hydrogen, $C_1$ to $C_{12}$ straight chain alkyl, $C_2$ to $C_{12}$ straight chain alkenyl, and phenyl radicals, $m$ is an integer from 5 to 11 and x is an integer from 1 to 7, and $$(CH_2)_xCHR_1[COOCH_2(CF_2)_mH]_2$$

wherein $R_1$ and $x$ have the values as above and $m$ is an integer from 4 to 10. The acid portion of the diesters may be, for example a succinyl, glutaryl, adipyl, pimelyl, suberyl, azelayl or sebacyl radical; a methyl-, n-propyl-n-butyl-, n-dodecyl-, n-octenyl, n-dodecenylsuccinyl radical, or phenylsuccinyl radical, a 3-methyl-, 3-butyl-, 3-dodecyl-, 3-octenylglutaryl radical, a 3-phenylglutaryl radical, a 4-methyl-, 4-octyl-, 4-phenyladipyl radical, a 7-methyl-, 7-ethylazelayl radical, a 7-phenyl azelayl radical, etc. The fluoroalcohol portion of the diesters may be the residue of a perfluoroalcohol of the formula:

$$F(CF_2)_mCH_2OH$$

wherein $m$ is an integer from 5 to 11 or of a partially fluorinated alcohol of the formula:

$$H(CF_2)_mCH_2OH$$

wherein $m$ is an integer from 4 to 10. Among these diesters are, for example, bis (perfluorooctyl)-n-dodecenyl succinate, bis (perfluorohexyl)-3-methylglutarate, bis (perfluorooctyl)-3-methylglutarte, bis (ω-hydroperfluoroheptyl)-3-methylglutarate and -3-phenylglutarate, etc.

Partially fluorinated silanes which are solutes for the liquid compositions of the invention have the formula:

$$[F(CF_2)_mCH_2O]_nSi[O\text{-tert.}C_4H_9]_{4-n}$$

where $m$ is an integer from 1 to 7 and $n$ is an integer from 2 to 4, for example, bis(tert. butoxy)-bis(perfluoroheptoxy) silane, $[FCF_2)_6CH_2O]_2Si[O\text{-tert.}C_4H_9]_2$ and the perfluoroheptoxy silane tetramer $[F(CF_2)_6CH_2O]_4Si$.

Fluorocarbons which are solutes for the liquid surface-active compositions of the invention are fully fluorinated hydrocarbons and chloro-substituted fully fluorinated hydrocarbons of the general formula:

$$C_3F_7[CF_2CF(CF_3)]_mX$$

wherein X is a member of the group consisting of chlorine and fluorine radicals and $m$ is an integer from 1 to 6, e.g., 4-trifluoromethyl perfluorooctane, 2-chloro-4,6-di(trifluoromethyl) perfluorodecane, etc.

When the primary objective is displacement of liquid organic films from solid surfaces for short periods of time, e.g., from about 5 to 30 minutes, liquid surface-active compositions may be used which contain a small amount, for example, from about 0.5 to 1% by weight, of one of the aforedefined fluoroalcohols in a major amount of one of aforedefined volatile fluoroalkanes as the solvent. Typical of these compositions are those of the following specific examples in which parts are by weight.

EXAMPLE 1

| | Percent |
|---|---|
| Trichlorofluoromethane | 99 |
| Perfluorooctanol-1 | 1 |

EXAMPLE 2

| | Percent |
|---|---|
| 1,1,2-trichloro-1,2,2-trifluoroethane | 99 |
| Perfluorooctanol-1 | 1 |

EXAMPLE 3

| | Percent |
|---|---|
| 1,1,2,3 - tetrachloro - 1,2-difluoroethane and 1,1,2-trichloro-1,2,2-difluoroethane in 1:1 volume ratio | 99 |
| Perfluorooctanol-1 | 1 |

EXAMPLE 4

| | Percent |
|---|---|
| 1,1,2-trichloro-1,2,2-trifluoroethane | 99 |
| ω-hydroperfluorooctyl-2-ethanol | 1 |

EXAMPLE 5

| | Percent |
|---|---|
| 1,1,2-trichloro-1,2,2-trifluoroethane | 99 |
| Bis(perfluorooctyl)-n-dodecenylsuccinate | 1 |

EXAMPLE 6

| | Percent |
|---|---|
| 1,1,2-trichloro-1,2,2-trifluoroethane | 99 |
| Bis(tert-butoxy)-bis(perflorheptoxy)silane | 1 |

EXAMPLE 7

| | Percent |
|---|---|
| 1,1,2-trichloro-1,2,2-trifluoroethane | 99 |
| 4-trifluoromethyl perfluorooctane | 1 |

EXAMPLE 8

| | Percent |
|---|---|
| 1,1,2-trichloro-1,2,2-trifluoroethane | 99 |
| 2-chloro-4, 6-di(trifluoromethyl) perfluorodecane | 1 |

The liquid compositions, as typified by those in the above examples, are suitable for displacing liquid organic films from any surface, corrosive or non-corrosive.

Where it is desired to effect an indefinite or permanent type displacement of liquid organic films from solid surfaces, the solute in the liquid surface-active compositions is a fluoroacid of the formula, $$F(CF_2)_m(CH_2)_nCOOH$$

as defined above. The solute fluoroacid may be used in amounts of, for example, from about 0.02 to 0.1% by weight of the composition. These liquid compositions may be used for displacing liquid organic films from any solid surface since the solutes are only weakly acid due to the presence in the molecule of a long chain, $C_{10}$ to $C_{16}$, aliphatic hydrocarbon group between the electronegative fluorine atoms and the carboxyl group. These compositions are illustrated by the following specific examples in which parts are by weight.

EXAMPLE 9

| | Percent |
|---|---|
| 1,1,2-trichloro-1,2,2-trifluoroethane | 99.92 |
| $F(CF_2)_{10}(CH_2)_{10}COOH$ | 0.08 |

EXAMPLE 10

| | Percent |
|---|---|
| 1,1,2-trichloro-1,2,2-trifluoroethane | 99.92 |
| $F(CF_2)_7(CH_2)_{16}COOH$ | 0.08 |

In those surface-active compositions in which the solute is a fluoroacid of the formula $F(CF_2)_m(CH_2)_nCOOH$, the perfluoroalkane or fully fluorinated bromo- or chloroalkane solvent may be replaced in part by an aliphatic naphtha of 108° F. to 140° F. minimum flash point and to the extent that the ratio of the former to the latter in the compositions is from about 3:1 to 2:1 by weight. In such compositions, the naphtha serves as diluent and, in the case of liquid aliphatic organic films which are to be displaced, to promote the solubility of the compositions in respect to the aliphatic hydrocarbon portion of the film.

Since the monolayers deposited by the liquid compositions of the invention are hydrophobic and oleo phobic, appropriate compositions can be applied as abhesives, e.g., mold-release agents, or, when the solute is a fluoroalcohol, a fluoromonocarboxylic acid, or a partially fluorinated diester, as dust-repellents on metals, glass, resins and polymers. Most of the deposited monolayers are effective in preventing or inhibiting subsequent corrosion of steel by the humid atmosphere.

For the displacing of liquid organic films from solid surfaces which are non-corrosive, i.e. those which do not readily oxidize; such as nickel, gold, platinum and rhodium and glass, resins and polymers, liquid surface-active compositions may be used in which the solute is a fluoroacid of the formulas, $F(CF_2)_mCOOH$, $H(CF_2)_mCOOH$, $(CF_3)_2CF(CF_2)_mCOOH$, $CF_3(CF_2Cl)CF(CF_2)_mCOOH$, as defined above. These solutes may be used in amounts of, for example, from about 0.08 to 1% by weight of the compositions in a solvent which is one of the aforementioned volatile liquid perfluoroalkanes or fully fluorinated bromo- or chloralkanes.

While the invention has been described herein with reference to certain specific embodiments thereof, these are intended by way of illustration and not in limitation except as may be defined in the appended claims.

What is claimed and desired to be secured by Letters Patent of the United States is:

1. A nonaqueous liquid surface-active composition for displacing liquid organic films from solid surfaces which consists essentially of a fully halogenated alkane selected from the group consisting of volatile liquid perfluoroalkanes and volatile liquid fully fluorinated bromo- and chloroalkanes and from about 0.02 to 1% by weight of a solute selected from group consisting of fluoroalcohols of the formulae:

$$F(CF_2)_mCHROH$$

wherein $m$ is an integer from 1 to 11, and R is a member of the group consisting of hydrogen and perfluoroalkyl radicals having from 1 to 11 carbon atoms, $$F(CF_2)_m(CH_2)_nCH_2OH$$

wherein $m$ is an integer from 1 to 10 and $n$ is an integer from 1 to 15, $$H(CF_2)_mCH_2OH$$

wherein $m$ is an integer from 2 to 10, $$H(CF_2)_mCHOH(CH_3)$$

and $$H(CF_2)_mCOH(CH_3)_2$$

wherein $m$ is an integer from 2 to 8, fluoromonocarboxylic acids of the formulae:

$$F(CF_2)_m(CH_2)_nCOOH$$

wherein $m$ is an integer from 1 to 10 and $n$ is an integer from 2 to 16, $$F(CF_2)_mCOOH$$

wherein $m$ is an integer from 1 to 13, $$(CF_3)_2CF(CF_2)_mCOOH$$

and $$CF_3(CF_2Cl)CF(CF_2)_mCOOH$$

wherein $m$ is an integer from 1 to 11, and $$H(CF_2)_mCOOH$$

wherein $m$ is an integer from 1 to 14, partially fluorinated diesters of the formulae:

$$(CH_2)_xCHR_1[COOCH_2(CF_2)_mF]_2$$

wherein $R_1$ is a member of the group consisting of hydrogen, $C_1$ to $C_{12}$ straight chain alkyl, $C_2$ to $C_{12}$ straight chain alkenyl and phenyl radicals and $m$ is an integer from 5 to 11, and $$(CH_2)_xCHR_1[COOCH_2(CF_2)_mH]_2$$

wherein $R_1$ and $x$ have the values as above and $m$ is an integer from 4 to 10, partially fluorinated silanes of the formula:

$$[F(CF_2)_mCH_2O]_nSi[O\text{-tert.}C_4H_9]_{4-n}$$

wherein $m$ is an integer from 1 to 7 and $n$ is an integer from 2 to 4, and fully fluorinated hydrocarbons and chloro-substituted hydrocarbons of the formula:

$$C_3F_7[CF_2CF(CF_3)]_mX$$

wherein X is a member of the group consisting of chlorine and fluorine radicals and $m$ is an integer from 1 to 6.

2. A composition as defined in claim 1, wherein the solute is perfluorooctanol-1.

3. A composition as defined in claim 1, wherein the solute is $F(CF_2)_7(CH_2)_{16}COOH$.

4. A composition as defined in claim 1, wherein the solute is $F(CF_2)_{10}(CH_2)_{10}COOH$.

5. A method of displacing liquid organic films from solid surfaces which comprises applying thereto a liquid surface-active composition as defined in claim 1.

6. A method of displacing liquid organic films from solid surfaces as defined in claim 5, wherein the solute in the liquid surface-active composition is perfluorooctanol.

7. A method of displacing liquid organic films from solid surfaces as defined in claim 5, wherein the solute in the liquid surface-active composition is $$F(CF_2)_7(CH_2)_{16}COOH$$

8. A method of displacing liquid organic films from solid surfaces as defined in claim 5, wherein the solute in the liquid surface-active composition is $$F(CF_2)_{10}(CH_2)_{10}COOH$$

References Cited

UNITED STATES PATENTS

| | | | |
|---|---|---|---|
| 2,765,851 | 10/1956 | Bond | 166—42 |
| 2,827,471 | 3/1958 | Gavlin et al. | 260—653 |
| 2,939,888 | 6/1960 | Barnhart et al. | 260—653 |
| 2,972,637 | 2/1961 | Tullock | 260—653 |
| 2,983,746 | 5/1961 | Smith et al. | 260—653 |
| 3,090,818 | 5/1963 | Long | 252—171 |

LEON D. ROSDOL, Primary Examiner

W. E. SCHULZ, Assistant Examiner

U.S. Cl. X.R.

134—40; 252—364; 260—652.5, 653